Figure 1:
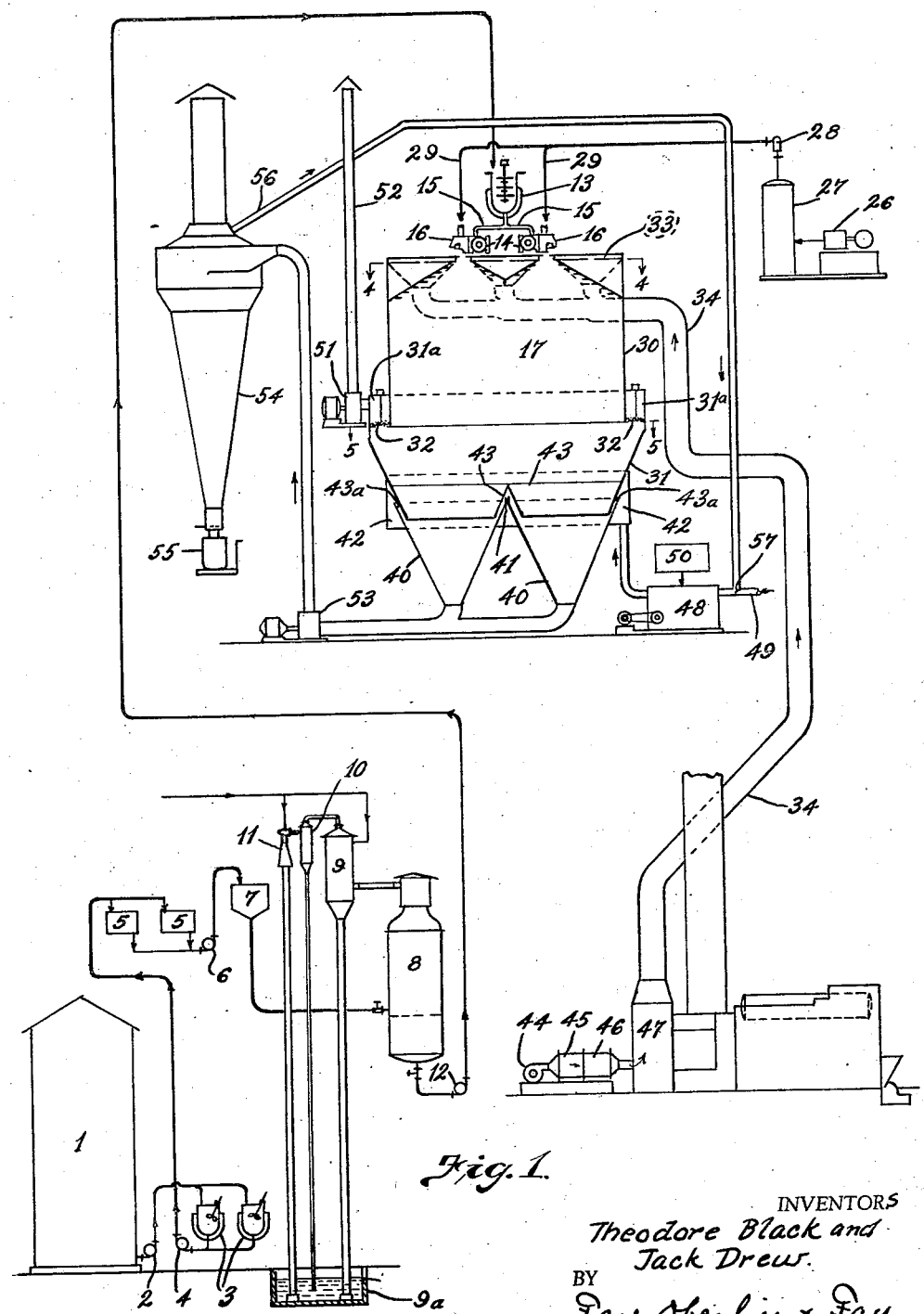

Dec. 4, 1934.  T. BLACK ET AL  1,983,434
MANUFACTURE OF POWDERED MOLASSES
Filed Nov. 29, 1933   2 Sheets-Sheet 1

INVENTORS
Theodore Black and
Jack Drew.
BY
Fay, Oberlin & Fay
ATTORNEYS

Dec. 4, 1934.　　　T. BLACK ET AL　　　1,983,434
MANUFACTURE OF POWDERED MOLASSES
Filed Nov. 29, 1933　　2 Sheets-Sheet 2

INVENTORS
Theodore Black and
Jack Drew
BY
Fay, Oberlin & Fay
ATTORNEYS

Patented Dec. 4, 1934

1,983,434

UNITED STATES PATENT OFFICE 1,983,434

MANUFACTURE OF POWDERED MOLASSES

Theodore Black and Jack Drew, Cleveland, Ohio, assignors to The Molaska Corporation, Cleveland, Ohio, a corporation of Ohio Application November 29, 1933, Serial No. 700,198

8 Claims. (Cl. 99—5)

This invention relates, as indicated, to an edible product, in the form of powdered molasses, and to a method of and apparatus for making such product.

The value of molasses in a mixed feed is well known to experienced feeders of livestock and poultry, but the use of molasses in liquid form for this purpose is at best, a tedious and disagreeable task. The sticky quality of molasses in this form renders mixing difficult, even when mixing equipment of the best available type is employed, and in cold weather, the viscosity of the molasses is such as to render proper mixing almost impossible, the molasses clogging the mixer. In extremely cold weather, it often becomes necessary to store the molasses in heated rooms or to heat the molasses preparatory to using it, in order to cause it to flow readily. Liquid molasses, moreover, must be packed and shipped in relatively expensive metallic drums or heavy wooden barrels, and since molasses contains from about 20% to 30% of water, the cost of such containers as well as the cost of handling and shipping are important considerations in the use of molasses for feed and other purposes. Liquid molasses, furthermore, contains a large number of solid and gaseous impurities which are harmful to cattle.

In an effort to overcome some or all of the aforesaid disadvantages incidental to the use of liquid molasses, many attempts have heretofore been made to convert liquid molasses into powdered form, and although products of varying degree of fineness and color have been produced on a laboratory scale, no one has apparently successfully converted molasses into the form of a dry, fine, free-flowing powder on a commercial scale, and at the low cost requisite to the production and sale of molasses in any form.

Among the reasons for the failure of previous attempts to produce powdered molasses may be mentioned the following:

1. Owing to the high temperatures employed in some drying methods, a large proportion of the volatile solid constituents of the molasses were driven off and lost, and the remaining solids were so changed chemically as to impair the taste and food value of the molasses. Sugars, for example, were caramelized to a great degree.

2. Where vacuum dryers operating at low temperatures have been employed, it has been found difficult to maintain in such dryers the conditions which we have found necessary to drive from the molasses the last traces of water, so that it is impossible, by the use of such dryers, to obtain a powder which is sufficiently dry to be bagged without agglomerating.

3. Although various methods and apparatus have been found practical in the drying of various other edible products, such as milk, the physical characteristics and chemical nature of molasses are such as to inhibit dehydration by means of such existing method and apparatus.

4. Even if it were possible to produce powdered molasses with existing types of driers, the number of units which would be required to make powdered molasses on a commercial scale would be so large, that the first cost and cost of operation thereof would prohibit the sale of the product at the low price at which it must be sold.

We have determined after a long series of experiments, the essential factors and precise conditions under which a dry, free-flowing molasses powder may be manufactured on a commercial scale and at a cost sufficiently low to permit its extensive use in live-stock feeding and for a large number of other purposes.

To the accomplishment of the foregoing and related ends, said invention, then, consists of the means and steps hereinafter fully described and particularly pointed out in the claims, the annexed drawings and the following description setting forth in detail certain means, one mode and one product constituting, however, but one of the various applications of the principle of our invention.

In said annexed drawings:—

Figure 2:
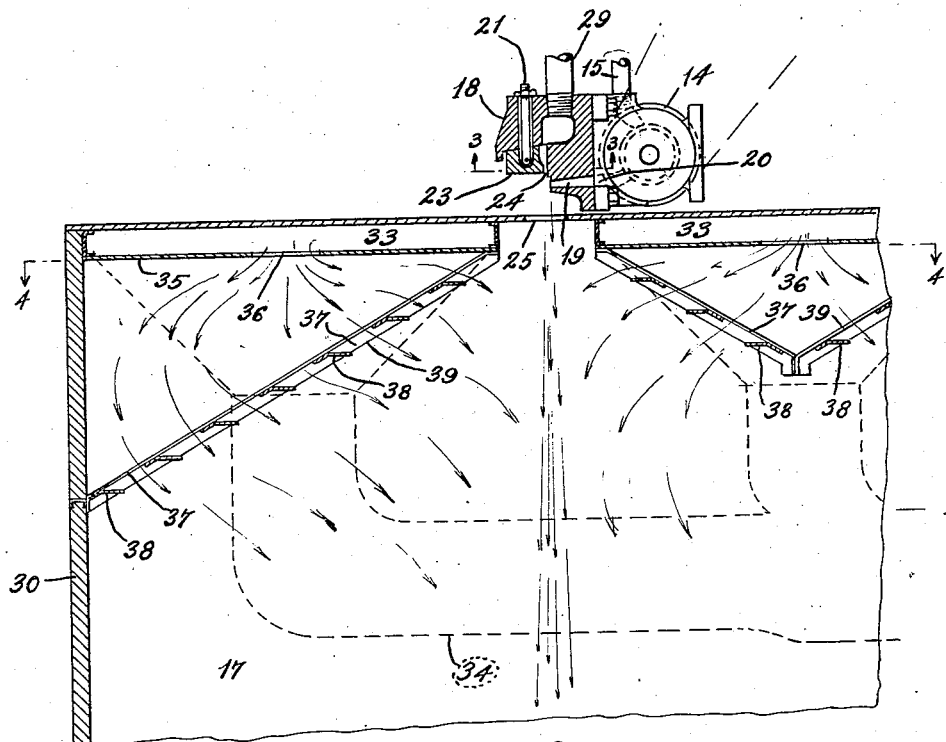
Figure 3:
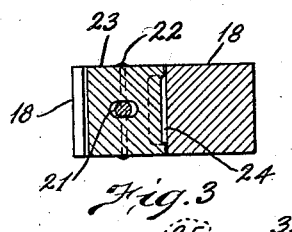
Figure 5:
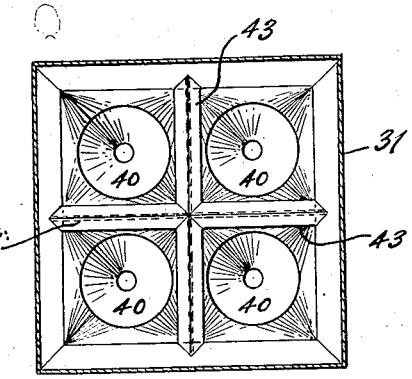
Figure 4:
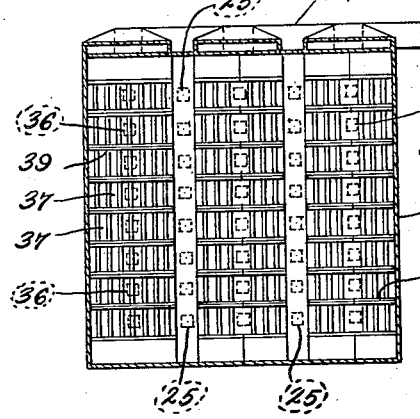

Fig. 1 is a view illustrating more or less diagrammatically the apparatus which we employ in manufacturing the powdered molasses; Fig. 2 is a fragmentary vertical cross-sectional view of a portion of the drying tower; Fig. 3 is a cross-sectional view of the atomizer taken on the line 3—3 of Fig. 2; Fig. 4 is a cross-sectional view of the drying tower, taken on a plane substantially indicated by the line 4—4 of Figs. 1 and 2; and Fig. 5 is a cross-sectional view of the drying tower, taken on a plane substantially indicated by the line 5—5 of Fig. 1.

Although molasses of various grades may be treated by our process and converted into powdered form, we prefer to start with a good grade of cane molasses, which contains about 30% of water and a total sugar content of approximately 50%–60% by weight of the molasses.

The raw molasses is stored in a storage tank 1 which may be provided with a heating element (not shown), or other suitable heating means to facilitate the removal of the molasses from the tank in cold weather. The molasses is continuously removed from the lower portion of tank 1 by means of a pump 2 which elevates the molasses to steam-jacketed treating tanks 3, to which a mineral filter-aid, such as a filter-cell, is added and the mixture heated to a temperature of about 160° F. and agitated for about 15 minutes.

The aforesaid mixture is then elevated and forced by means of a pump 4 through pressure filters, which clarify the molasses, removing therefrom all foreign substances, such as cane fibres, gums and other solid matter likely to prove injurious to cattle or the like.

The clarified molasses is then elevated by means of a pump 6 to a tank 7, which forms the supply tank for the concentrating evaporator 8. The molasses flows by gravity to the evaporator 8 wherein it has removed from it, approximately 95% of its water content, as well as certain incondensible gases, such as carbon dioxide, hydrogen sulphide, ammonia, etc. The evaporator 8 is preferably of a high speed film type, and has maintained therein substantially the maximum vacuum obtainable, e. g. 29 inches. The temperature of the molasses within the evaporator does not exceed about 150° F. Vacuum is produced in evaporator 8 by means of the primary condenser 9, which condenses the major portion of the water vapor issuing from the evaporator, the condensate flowing into a hot well 9a. The incondensible gases are drawn off into a water trap 10, in which the water entrained by these gases is separated from the gases and drained into the hot well 9a. A secondary condenser 11 serves to remove whatever vapors have not been condensed by the primary condenser and removes all of the incondensible gases. The condenser arrangement is such that the desirable high vacuum condition in evaporator 8 is easily and economically maintained. The concentration of the molasses under a high degree of vacuum enables the major portion of the water to be removed at a temperature sufficiently low to avoid danger of caramelization of sugars. By removing a major portion of the water at this stage of the process, the powder production capacity of the drying or spray tower, to be presently described, is greatly increased.

The concentrated molasses is then elevated by means of a pump 12 to a steam-jacketed agitating tank or vessel 13, in which the molasses is heated and agitated to a degree wherein it can be properly sprayed into the drying tower. The molasses contains a sufficient quantity of water to enable it to be preheated in tank 13 to a temperature of from about 200° F. to about 238° F., and preferably 220° F., without being burned, the heating being continued until the molasses attains a specific gravity of 1.50–1.54.

The molasses, which is now in highly concentrated condition, is then drawn by rotary force pumps 14 through conduits 15 to the atomizers 16, which atomize and spray the molasses into the drying tower 17. The rotors of the pumps 14 are driven at a very high speed and their action on the heavy molasses passing through the pumps is such as to break up the molasses and work it into a homogeneous mass. This action, which we term "homogenizing" is highly important in that it renders all of the particles of uniform composition and density, so that when these particles are subsequently sprayed and dried, all of them become dried at the same instant and the level at which they become dry can be accurately determined. Each atomizer, as clearly shown in Figs. 2 and 3, consists of an angle-shaped head 18 which is bolted or otherwise secured to the pump 14 and is provided with a horizontally extending discharge outlet 19 in registration with the discharge port 20 of the pump. Secured to the head 18, as by means of a bolt 21, which is pivoted to a pin 22 extending through the bolt, is a nozzle piece 23. The nozzle piece 23 is provided with a shallow recess 24 in one side thereof, so that when the nozzle piece is brought into engagement with the atomizer head by drawing up the bolt 21, a vertically extending air discharge orifice is formed by the head and nozzle piece. Owing to the provision of the inclined cooperating seating surfaces on the head and nozzle piece respectively, the mere drawing up of the bolt 21 is sufficient to insure proper engagement of the nozzle piece with the head.

For the purpose of atomizing the molasses which is forced through the discharge outlets 19 of the atomizers, air, under a pressure of 50 to 125 pounds per square inch, is forced through the air discharge orifices of the atomizers, the air pressure and rate of discharge of the molasses being so correlated that a fan-shaped spray having an angle of spread of approximately 4° is caused to pass in a vertical direction downwardly through each of the openings 25 in the top of the drying tower. The velocity of the spray is approximately 20 to 30 feet per second, and about one gallon of molasses per minute is discharged from each atomizer. Air is supplied to the atomizers by an air compressor 26, being stored in receiver 27, from which it passes through an oil and air filter 28 to the supply conduits 29. It will be noted that the atomizers are mounted externally of the drying tower. This arrangement of the atomizers prevents the molasses from being discharged internally of the tower in event of failure of the compressed air supply.

Within the drying tower, the sprays are subjected to currents of heated air which are so directed at the sprays as to cause instantaneous evaporation of the small amount of water contained within each particle of the atomized molasses.

The drying tower consists of an open-bottom upper portion 30 which is substantially rectangular in horizontal cross-section and extends into the lower frusto-pyramidal portion 31 of the tower. The upper end of the portion 31 of the tower is spaced somewhat from the walls of the upper portion 30 so as to provide space for a duct 31a in the base of which are disposed a plurality of vibrating screens 32, which serve a purpose to be presently described.

Disposed directly beneath the top of the drying tower is a plurality of shallow hot-air distributing ducts 33, each of which communicates at one end with a main supply duct 34 and is closed at the other end, being provided in its bottom 35 with a plurality of discharge openings 36 spaced to correspond with the atomizers 16. The hot air issuing from the openings 36 passes downwardly and outwardly through rectangular openings 37 formed by mounting a plurality of spaced angular baffle plates 38 on pairs of spaced inclined angles 39, the baffles serving to deflect the air inwardly towards the sprays. The angles 39 are so spaced that the openings 37 are aligned with the atomizers 16 and openings 25, as clearly shown in Fig. 4. The spaces between the ducts 33 and the baffle plates 38 form plenum chambers from which the hot air is uniformly distributed by means of the baffles. The remaining part of the interior of the portion 30 of the drying tower is the drying zone 17. This zone extends to about the level of the vibrating screens 32. The lower portion 31 of the drying tower extends into a unit consisting of four hoppers 40, the upper interior edges of which are spaced from each other sufficiently to provide a passageway 41 through which air from duct 42 may be forced into the interior of the hoppers, such air being deflected downwardly into the hoppers by means of a cruciform baffle 43, which is of angular cross-section and is supported in spaced relation to the walls of the hoppers by the walls of the lower portion 31 of the drying tower. The exterior walls of the hoppers 40 are also spaced from the walls of the portion 31 of the drying tower sufficiently to provide a passageway 43a, through which air from duct 42 may be forced into the interior of the hoppers, the walls of the lower portion of the drying tower serving to deflect the air downwardly into the hoppers in the same manner as the baffle 43. The hoppers are of rectangular cross-section at their upper ends and of circular cross-section at their lower ends.

Air is supplied to distributing ducts 33 by means of a blower or fan 44. The air from fan 44 passes through an exhaust steam heater 45, which heats the air to a temperature of about 200° F., thence through a live steam heater 46 which heats the air to a temperature of about 320° F., thence through a flue gas heater 47, which heats the air to a temperature sufficiently high to provide an average temperature of from about 365° F. to about 385° F. within the drying zone 17, the air being conveyed from the flue gas heater to the plenum chambers by means of the main duct 34.

As previously stated, the sprays within the drying zone 17 are subjected to the currents of hot air, the temperature and distribution of the air currents being such as to instantaneously dry the particles of molasses without burning the same or caramelizing the sugar therein. The velocity and direction of the hot air currents are moreover so controlled as not to impede the dry molasses particles from gravitating downwardly into the hoppers. The molasses particles, as a result of the drying operation are substantially completely dehydrated, but are too soft to be transported without agglomerating and adhering to the walls of the hoppers and conveyor pipes. The dried particles are therefore hardened or stabilized by being quickly cooled by a current of dry cool air, which is forced into the hopper through the passages 41 and 43a, the cool air filling the hoppers and forming a distinct cooling zone of relatively cold air immediately below the zone of hot air within the drying tower. By directing the cooling air downwardly along the walls of the hoppers, accumulation of powder on such walls is effectively prevented. Air for cooling the powder particles is supplied to the duct 42 by a unit 48, which receives air from conduit 49 and/or conduit 56 and filters, cools, dehumidifies and reheats the same to a temperature of 70° F. to 90° F. to reduce its relative humidity to less than 40%. Cool water is supplied to unit 48 by means of a decalorator 50.

The water-vapor or hot moist air resulting from the drying operation in the drying zone 17 is continuously drawn by an exhauster 51 through screens 32 into duct 31a and out into the atmosphere by means of stack 52. Some particles of the dried molasses may be entrained by the hot moist air, but these are prevented from escaping into the atmosphere by the vibrating screens 32.

The screens 32 are removable while the dryer is in operation, and are vibrated in a manner to prevent clogging thereof by the powdered molasses.

The cool dry air carrying in suspension the dry, hardened particles of molasses is exhausted from the hoppers by an exhauster 53, which blows the powder into a cyclone separator 54, which is designed to separate the powder from the air in which it is suspended. The powder falls to the lower end of the separator, from which it is removed as desired, being packed in bags 55. Some of the cool dry air in the cyclone may, if desired, be recirculated through conduit 56 and retreated in unit 48. A damper valve 57 at the intersection of conduits 49 and 56 permits air to be drawn from either or both conduits as desired.

The use of a multiplicity of atomizers, arranged in the manner described, avoids the concentration of too large a volume of liquid in a given area in the tower and enables the liquid to be evenly distributed throughout the area of the tower. This permits the hot drying air to perform its function most efficiently, avoids saturation of the hot air locally and enables the drying of the particles to take place almost instantaneously.

Moreover, the hot drying air is not permitted to become saturated with moisture extracted from the particles of molasses, but instead, it is withdrawn or exhausted from the drying zone while the air is still at a low relative humidity. We have, in fact, found that molasses cannot be dehydrated unless the hot drying air is withdrawn from the tower while still possessing a low relative humidity. If the spent drying air is not removed under these conditions, the finely divided particles of molasses, owing to their high hygroscopicity, would quickly reabsorb the moisture in the spent drying air and become agglomerated. In other words, if the capacity of the hot drying air for absorbing moisture was reduced to any considerable extent, the molasses particles would tend to pick up the moisture which they had previously yielded to the incoming high moisture-absorbing air.

As previously stated, the homogenizing of the molasses enables all of the particles, as they are sprayed into the tower, to become dry at the same instant. The level at which this drying occurs in the tower can be accurately determined, and the level at which we exhaust the partially saturated air, i. e., the lower edge of the upper portion 30 of the tower, is somewhat below the level at which the drying is completed. By removing the spent and partially saturated drying air from the tower just below the level at which the particles have become substantially dehydrated, such particles are removed from the influence of the drying air and will not be subsequently affected by the moisture which the drying air has absorbed. Prolonging the exposure of the dry molasses particles to the hot drying air would have a deleterious effect on the quality of the powder, resulting in inversion of sugar, caramelization, loss of volatile solids, etc.

The downward flow of the hot drying air is impeded or neutralized by the introduction of the dry cool air into the hoppers. This cooling air is introduced in volume sufficient to fill the lower portion of the drying tower and to provide an excess which is sufficient to create a slight upward pressure to prevent the hot drying air from descending into the tower below the level at which it is desired to exhaust such drying air. This greatly facilitates the removal of the drying air. The upward pressure of the cooling air cushions the fall of but does not impede the downward flow of the dry molasses powder into the hoppers. The dry cooling air is supplied in volume which is not only sufficient to thus prevent the hot drying air from penetrating into the lower part of the drying tower, but also to provide a medium for transporting the powder to the cyclone separators.

It will also be noted that the walls of the lower part of the drying tower are inclined to facilitate the discharge of the powder and that the hoppers 40 are spaced from the remaining portion of the lower part of the tower. By thus insulating the hoppers from the balance of the drying tower, the transfer of heat from the walls of the upper part of the tower to the walls of the hoppers is minimized, so that the hopper walls are maintained in a relatively cool condition, providing cool surfaces upon which the powder is deposited.

Molasses, as manufactured by this process, is in the form of a substantially dry, fine, free-flowing powder, containing not more than about 1% of water, and is in a highly stable condition, that is to say, it will retain its powdery, free-flowing properties as long as it is not exposed to highly humid atmospheric conditions or abnormally high temperatures. It can be readily packed into bags or other containers, and in such containers, will retain its free-flowing qualities indefinitely.

As a result of the various treatments to which the molasses is subjected, it is virtually pasteurized and freed from harmful bacteria and gases, but none of the essential constituents, such as sugars and minerals, are chemically changed.

The powdered molasses can be packed in inexpensive containers, such as bags, and shipped at lower cost than liquid molasses.

It can be easily stored and handled and is admirably well adapted for use in feeding livestock and poultry, as it will not stick to the teeth of livestock, produce lumpy feed, clog the jaws or cause cankerous tongue. In addition to such use, it is well adapted for use as a food for table use, in bakeries, as a filler for various manufactured products, such as candy and medicines, and for numerous other purposes.

Other processes may be employed embodying the features of our invention instead of the one herein explained, change being made as regards the steps and means herein disclosed, provided the elements stated by any of the following claims or the equivalent of such stated elements be employed, whether produced by our preferred method or by others embodying steps equivalent to those stated in the following claims.

We therefore particularly point out and distinctly claim as our invention:—

1. The method which comprises spraying liquid molasses into a zone of air maintained at a uniform temperature within the range 365° F.–385° F. to convert the molasses into the form of a fine powder, causing the powder to suddenly strike a zone of air at a temperature within the range 70° F.–90° F. and having a relative humidity of less than 40% to harden the powder particles, said second zone being distinct from said first zone and containing substantially none of the hot moist air thereof, and continuously withdrawing the powder from the cooling zone.

2. The method of converting liquid molasses into the form of a dry, free-flowing powder, which comprises spraying the molasses downwardly through a zone of hot air to dehydrate the same and into a zone of dry cool air to harden the dried particles of molasses, continuously removing the moisture carrying hot air at the junction of the hot and cool zones while exhausting the cool air containing the molasses particles in suspension at a point lower than said junction and separating said particles from said exhausted cool air.

3. The method of converting liquid molasses into the form of a substantially dry, free-flowing powder, which comprises concentrating the molasses by evaporation under vacuum conditions to remove a major portion of its water content, spraying the concentrated molasses downwardly through zones of hot and cool air to respectively substantially complete the dehydration of the molasses and harden the dried particles so as to prevent agglomeration thereof, and continuously drawing off the hot vapor-carrying air at points adjacent the base of the drying zone.

4. The method of converting liquid molasses into the form of a substantially dry, free-flowing powder, which comprises concentrating the molasses by evaporation under vacuum conditions to remove a major portion of its water content, spraying the concentrated molasses downwardly through a tower in the upper portion of which is maintained a zone of hot drying air and in the lower portion of which is maintained a zone of relatively cool air, said hot air causing instantaneous evaporation of substantially all of the remaining water in the sprayed particles and said cool air causing the dried particles to harden, continuously drawing off the moisture-carrying hot air at the junction of the two zones and continuously removing the cool air and particles entrained therein at the base of the cooling zone.

5. The method of converting liquid molasses into the form of a substantially dry, free-flowing powder, which comprises concentrating the molasses by evaporation under vacuum conditions to remove a major portion of its water content, spraying the concentrated molasses downwardly through zones of hot and cool air successively, said zone of hot air being maintained at an average temperature of from about 365° F. to about 385° F. and said zone of cool air being maintained at a temperature of less than 90° F., continuously drawing off the moisture-laden hot air at the junction of the two zones and continuously removing the powder at the base of the cooling zone and separating the cooling air from said powder.

6. The method of converting liquid molasses into the form of substantially dry, free-flowing powder, which comprises adding to the molasses a mineral filter-aid, filtering the molasses so treated to remove therefrom foreign matter, concentrating the molasses by evaporation under vacuum conditions to remove a major portion of its water content, heating and agitating the concentrated molasses, spraying the molasses into a zone of hot drying air to substantially complete the dehydration of the molasses, and continuously removing the moisture-carrying drying air from said zone at the base of said zone.

7. The method of converting liquid molasses into the form of a dry, free-flowing powder, which comprises concentrating the molasses under vacuum conditions and at a temperature not exceeding about 150° F. until approximately 95% of its water content has been removed, agitating the concentrated molasses while heating it to a temperature of from about 200° F. to about 238° F., and thereafter immediately spraying it downwardly through a zone of heated air providing an average temperature of from about 365° F. to about 385° F. to substantially complete the dehydration of the molasses.

8. The method of converting liquid molasses into the form of a dry, free-flowing powder, which comprises concentrating the molasses under vacuum conditions and at a temperature not exceeding about 150° F. until approximately 95% of its water content has been removed, agitating the concentrated molasses while heating it to a temperature of from about 200° F. to about 238° F., and thereafter immediately spraying it downwardly through a zone of heated air providing an average temperature of from about 365° F. to about 385° F. to substantially complete the dehydration of the molasses and into a zone of dry cool air disposed below the hot air zone, said cool air being maintained at a temperature not in excess of about 90° F. and at a relative humidity of less than 40%.

THEODORE BLACK.
JACK DREW.